US012037188B1

(12) United States Patent
Goodman

(10) Patent No.: US 12,037,188 B1
(45) Date of Patent: Jul. 16, 2024

(54) DEVICE TO SECURE PLASTIC TRASH LINER TO RECEPTACLE AND CLOSURE DEVICE

(71) Applicant: Erik Spencer Goodman, Austin, TX (US)

(72) Inventor: Erik Spencer Goodman, Austin, TX (US)

( * ) Notice: Subject to any disclaimer, the term of this patent is extended or adjusted under 35 U.S.C. 154(b) by 0 days.

(21) Appl. No.: 18/172,638

(22) Filed: Feb. 22, 2023

Related U.S. Application Data

(60) Provisional application No. 63/307,715, filed on Feb. 25, 2022.

(51) Int. Cl.
*B65F 1/06* (2006.01)
*B65D 33/16* (2006.01)

(52) U.S. Cl.
CPC ................ *B65F 1/06* (2013.01); *B65D 33/16* (2013.01); *B65D 33/1616* (2013.01); *B65D 33/1625* (2013.01)

(58) Field of Classification Search
CPC . B65D 33/1625; B65D 33/16; B65D 33/1616
See application file for complete search history.

(56) References Cited

U.S. PATENT DOCUMENTS 1,242,139 A * 10/1917 Callahan ............ B65D 33/1625 383/41
3,170,213 A * 2/1965 Thomas, Jr. .............. A41F 1/00 24/30.5 S
3,348,595 A 3/1967 Stevens
3,357,070 A * 12/1967 Soloan ..................... A45D 8/34 132/273
3,775,810 A * 12/1973 Smith, Jr ........... B65D 33/1625 206/242
3,820,200 A 6/1974 Myers
4,189,808 A * 2/1980 Brown ............... B65D 33/1625 24/30.5 R
4,267,995 A * 5/1981 McMillan ................ H02G 3/32 248/74.1
4,357,740 A 11/1982 Brown
4,570,304 A * 2/1986 Montreuil ................. B65F 1/06 220/495.11

(Continued)

FOREIGN PATENT DOCUMENTS

FR 1277743 A * 1/1961
GB 2302907 A * 2/1997 ......... B65D 33/1625

OTHER PUBLICATIONS

Liner Tle (https://linertite.com/) printed Mar. 21, 2024.*

*Primary Examiner* — Kevin R Kruer

(57) ABSTRACT

The present invention relates to a disk-shaped device for securing plastic trash liners in a trash receptacle, with two durable 53 mm diameter, 3 mm thick embodiments. The first embodiment has eight isosceles triangular flaps, positioned around the central point, with tips at the center and bases in contact with the circumferential rim. The second embodiment has eight curvilinear arced triangular flaps, positioned around the central point, with bases in contact with the circumferential rim and tips positioned around a central 2 mm aperture. The liner is threaded through the central point or aperture, allowing the flaps to flex and create a tight seal, preventing slipping.

1 Claim, 11 Drawing Sheets

(56) References Cited

U.S. PATENT DOCUMENTS

| | | | | |
|---|---|---|---|---|
| 4,631,783 | A * | 12/1986 | Hayashi | F16M 13/022 24/30.5 S |
| 4,644,610 | A * | 2/1987 | Fish | F16L 3/223 24/30.5 S |
| 4,697,312 | A * | 10/1987 | Freyer | B65D 33/1625 24/30.5 R |
| 4,914,789 | A * | 4/1990 | Pedersen | B65D 33/1625 24/30.5 S |
| 5,404,621 | A | 4/1995 | Heinke | |
| 5,644,799 | A * | 7/1997 | Armenta | A45D 8/34 132/273 |
| 5,695,088 | A * | 12/1997 | Kasbohm | B65F 1/06 248/314 |
| 5,987,708 | A * | 11/1999 | Newton | B65D 33/1625 24/30.5 R |
| 6,161,263 | A * | 12/2000 | Anderson | A41B 11/002 24/30.5 S |
| 7,243,811 | B1 * | 7/2007 | Ramsey | B65F 1/06 220/495.11 |
| 7,980,411 | B2 | 7/2011 | Kasbohm | |
| 8,485,380 | B1 * | 7/2013 | Abrams | B65D 51/00 428/321.5 |
| 8,672,171 | B2 | 3/2014 | Wynn | |
| 8,931,242 | B1 * | 1/2015 | Sardo | B65D 33/1625 383/71 |
| 10,099,855 | B1 | 10/2018 | Higgins, II | |
| 10,287,721 | B1 * | 5/2019 | Rizzo | A41D 27/08 |
| 2002/0083560 | A1 * | 7/2002 | Mennitto | B65D 33/1625 24/30 |
| 2007/0289972 | A1 * | 12/2007 | Wynn | B65F 1/06 220/495.06 |
| 2008/0005870 | A1 * | 1/2008 | Chase | B65F 1/06 24/30.5 R |
| 2008/0256759 | A1 * | 10/2008 | Kasbohm | B65F 1/06 24/30.5 S |
| 2008/0257891 | A1 * | 10/2008 | Kovacevich | B65F 1/08 220/495.11 |
| 2008/0285895 | A1 * | 11/2008 | Murgul | B65D 33/065 383/93 |
| 2012/0145291 | A1 * | 6/2012 | Gilbert | B65D 65/02 53/461 |
| 2017/0101262 | A1 | 4/2017 | Boorman | |
| 2019/0291925 | A1 * | 9/2019 | Milbrandt | B65D 71/504 |
| 2021/0214155 | A1 | 7/2021 | Hampton | |
| 2021/0221549 | A1 | 7/2021 | Orr | |
| 2022/0234777 | A1 | 7/2022 | Thistle | |

* cited by examiner

DEVICE TO SECURE PLASTIC TRASH LINER TO RECEPTACLE AND CLOSURE DEVICE

This application claims the benefit of provisional patent application Ser. No. 63/307,715 filed Feb. 25, 2022, by the present inventor.

BACKGROUND-PRIOR ART

A loosely fitted trash liner or a liner with an open end larger than the mouth of the trash receptacle will often collapse into the receptacle when trash is first inserted. See, "3 Never-Fail Ways to Keep Your Trash Bag from Falling into Your Can" David Redstone blogpost Plastic Place, Mar. 11, 2015. This problem is annoying, unsanitary and wastes time since the liner must be refitted to the trash receptacle after it slips from the rim of the receptacle. Solutions do exist: the commercial development of a plastic trash liner with an elastic opening that fits snugly over the rim of the receptacle U.S. Pat. No. 9,604,760 (2014); tying a knot just below the rim of the receptacle with the excess portion of the liner that has been draped over the receptacle's rim; affixing an elastic band over both the open end of the liner and the rim of the receptacle, known as trash can bands; manually affixing a wire "twist tie" to the excess portion of the liner so that the liner fits snugly over the rim of the receptacle.

The "prior art" can be understood as a collection of existing inventions and designs related to preventing a trash liner from slipping into a trash receptacle, and these inventions can either be modifications to the liner itself, "standalone" devices to "cinch", "restrain", "hold" or "secure." a liner or inventions integrated into the design of the receptacle itself that prevent a liner from slipping. See for example U.S. Pat. No. 8,672,171 (2014); U.S. Pat. No. 9,079,711 (2015). The most relevant prior art consists of the following standalone inventions U.S. Pat. No. 4,189,808 (1980) describes "A button-like body formed of a thin elastic material [and] is provided with a plurality of slots which intersect one another adjacent the center of the body to define a plurality of triangular resilient prongs having adjacently disposed pointed inner ends located in close proximity to one another. The body, except for a rim portion, is cone shaped with an upturned rim which surrounds a part of a convex outer side of the conical portion".

A cone-shaped device for preventing a trash liner from slipping into a receptacle has several disadvantages. One disadvantage is the difficulty of threading the trash liner through the cone. The cone shape creates an awkward and potentially cumbersome process for inserting the liner into the device. The rigidity of prongs can potentially be a disadvantage ergonomically. If the prongs are too rigid, they may be difficult to manipulate, especially for people with limited hand dexterity or strength. This could make it challenging for some users to properly secure the trash liner in the trash can. Additionally, if the prongs are too stiff, they may be more likely to cause injury if a user accidentally pinches their fingers while manipulating the device. This is especially important to consider if the device is intended for use by children or older adults. Another disadvantage is the storage of the cone-shaped device. The cone's shape and size may make it more difficult to store in a compact manner, potentially taking up more space in a trash room or storage area. Additionally, the cone shape may not be as versatile as other shapes in terms of accommodating various sizes and shapes of trash receptacles. These limitations may result in decreased user satisfaction and reduced effectiveness of the device compared to other alternatives.

U.S. Pat. No. 4,570,304 (1986) Another such circular "standalone" invention might be described as a "single slot device." This invention "consists of a thin piece of semi-flexible or rigid material into which has been cut or perforated an opening into said invention." All the "slack" material of the trash liner exposed on the outside of the trash container gets passed through the invention thereby securing the trash liner to the trash container preventing it from becoming mispositioned.

A liner inserted in the "slot" of this invention may be more likely to slip or shift out of position if it is not properly positioned, especially if the liner is full or heavy. This can result in a messy and unsanitary situation This invention may be difficult to use and not particularly user-friendly, as the user may need to carefully position the liner in the slot and ensure that it is properly secured. This can be time-consuming.

The difficulty in threading the liner through a slot can also be a disadvantage of this type of device. If the slot is narrow or difficult to access, it can be challenging to thread the liner through the slot, especially if the liner is large or full.

U.S. Pat. No. 10,099,855 (2018). A clip-on, standalone device is described as "A trash bag cinch device and method of use are provided for securing a trash bag to a trash can. According to one embodiment, the cinch device includes a collar, and the collar includes a base with teeth and a cuff with teeth. The cuff is moveable between an open position and a closed position and, when the cuff is closed, the base and the cuff describe an opening. And, when closed the base teeth and cuff teeth generally point toward the opening. The cinch device further includes a clamp adapted to secure the cinch device to a trash can rim. When thus positioned, a portion of the trash bag may be threaded through the opening and held by the teeth, thus securing the trash bag to the trash can."

A clip-on device for holding a trash liner in place may have several potential issues, including secure attachment, difficulty in attaching, limited versatility, stiff teeth that may not grip the liner effectively or cause injury, and the requirement of manual dexterity for actions such as clipping the device onto the trash can rim and inserting the liner through the rigid teeth. This may pose difficulties for users with limited hand dexterity and may limit the device's versatility in accommodating different types of trash liners U.S. Pat. No. 5,987,708 (1999) presents a rectangular standalone device that consists of "A pocket sized plastic restraint, having a rigid edge (1_a_) and flexible center (1_b_). In the flexible center (1_b_) is a flexible gripping strip opening (2_d_) that gathered excess liner material is inserted through and held tight by. The gripping strip opening (2_d_) is a serrated opening that bites into the gathered liner like teeth, to hold the bag tight without cutting it. At the base of the garbage bag restraint (2_c_) is a tucking strip opening (2_e_) for tucking excess bag material. The garbage bag restraint (2_c_) holds bags tight around the rim of containers that are smaller than the bag."

The serrated strip may be more complicated and time-consuming to thread the liner through, especially for users with limited hand dexterity or strength. It may also pose a risk of injury if a user accidentally pinches their fingers while manipulating the liner or the device, and the size and shape of the rectangular device may impact its ergonomics and comfort to use.

U.S. Pat. No. 5,695,088 (1997) and U.S. Pat. No. 7,980,411 (2011). A device that attaches to a trash receptacle with an adhesive patch and has a central membrane with slits that form a number of flaps which retain the trash liner. "A method and apparatus for securing a trash bag in a container is disclosed, where the apparatus has a substantially flat main body. The main body has a front surface and a back surface and the back surface has a mounting member attached thereto. A retaining tab extends substantially perpendicular from the front surface of the main body. A central membrane is located on the retaining tab and has a number of slits which form a number of flaps in the membrane, which deform when pressed to receive and retain the trash bag".

A device that attaches to a trash receptacle with an adhesive patch and has a central membrane with slits that form flaps to retain the trash liner may have several disadvantages, such as misalignment of the device, weak adhesion requiring periodic replacement, difficulty in threading, increased force required, and risk of injury The use of rigid members, such as prongs, slots, teeth, or flaps formed by slts, to hold a trash liner in place may present several disadvantages. Rigid members may be difficult to manipulate and may require more force, making them challenging to use for individuals with limited hand dexterity or strength. The rigidity of members may also pose a risk of injury if a user accidentally pinches their fingers while handling the liner or the device. Additionally, the rigid members may not be able to effectively grip and hold the liner in place, especially if the liner is full or heavy. The limited flexibility of the rigid members may also limit the device's versatility in accommodating different types and thicknesses of trash liners

SUMMARY OF EMBODIMENTS

The first embodiment is a disk-shaped device made of solid non-corrugated cardboard, also known as chipboard, with a thickness of 3 mm and a diameter of 53 mm. It is designed to secure plastic trash liners from slipping from the rim of a trash receptacle The device has eight identical triangular flaps, each with a creased base acting as a hinge mechanism, positioned around the center of the disk and in contact with the circumferential rim. The plastic trash liner is threaded through the central point on the reverse side where the flaps converge, then secured against the receptacle by pulling the loose end of the liner. The reverse side of the device features a circular adhesive strip with a peelable protective covering for attaching the device to a filled trash liner and acts as a closure.

The second embodiment of the disk-shaped device is made of molded rubber and has the same overall objective of securing a trash liner from slipping in a trash receptacle. The second embodiment has the same dimensions as the first but uses arced curvilinear triangular flaps instead of triangular flaps with a creased base as the hinge mechanism. It also features a 2 mm aperture or circular opening in the center of the disk to enable the device to be threaded The reverse side of the second embodiment does not have an adhesive strip.

Advantages

The advantages of one or more aspects of the devices described in the two embodiments are as follows:

1. Secure retention of trash liners: Both embodiments are designed to secure and retain plastic trash liners from slipping in a trash receptacle, providing a more efficient and effective solution for preventing liner slippage.
2. Hinge mechanism: The first embodiment includes a hinge mechanism in the form of triangular flaps with a creased base while the second embodiment includes triangular-shaped arced curvilinear flaps. Both hinge mechanisms allow for flexibility and adaptability of the flaps to the contour of the trash liner, ensuring a secure and stable grip.
3. Disk shape: The disk shape of the devices provides a compact and space-saving design that is easy to store and handle
4. Adhesive option. The first embodiment includes an adhesive strip on the reverse side, which serves as a convenient closure for a filled trash liner.
5. Durability. The first embodiment made of chipboard is affordable, reusable, easily stored in its flat shape, durable in repeated use without significant wear and tear, and effectively secures trash liners making it a cost-effective solution.

The second embodiment, made of molded rubber, offers durability and the ability to be washed for reuse Additionally, it is easily stored in its flat shape, making it a convenient solution for securing trash liners.
6. Versatility. Both embodiments have the same overall objective of securing a trash liner and can be used in a variety of trash receptacles.

DRAWINGS-FIGURES

FIG. 1 shows the view of the first embodiment from the user's perspective before it has been threaded. This is the obverse side of the embodiment.

FIG. 2 shows the reverse side of the first embodiment before it has been threaded and fitted against the liner and the receptacle.

Figure 3:
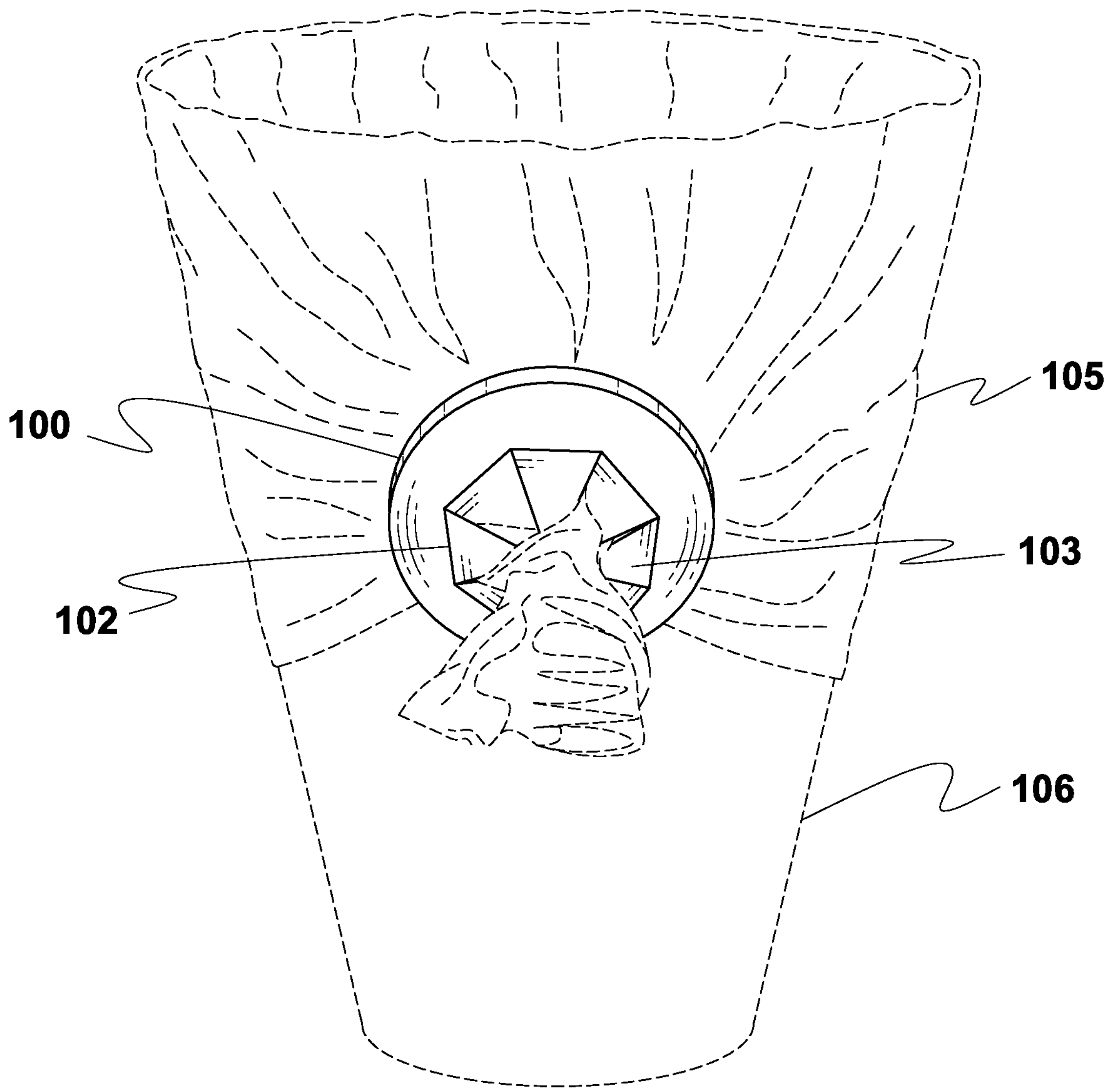

FIG. 3 shows the first embodiment of the device installed, showing what the receptacle, the trash liner, and the embodiment would look like together. This drawing provides a visual representation of how the device functions in practice, demonstrating how the hinge mechanism of triangular flaps with a creased base secures and retains the trash liner in place, preventing it from slipping into the receptacle. This drawing can help to illustrate the intended use of the device and how it fits into the larger context of a trash system.

Figure 4:
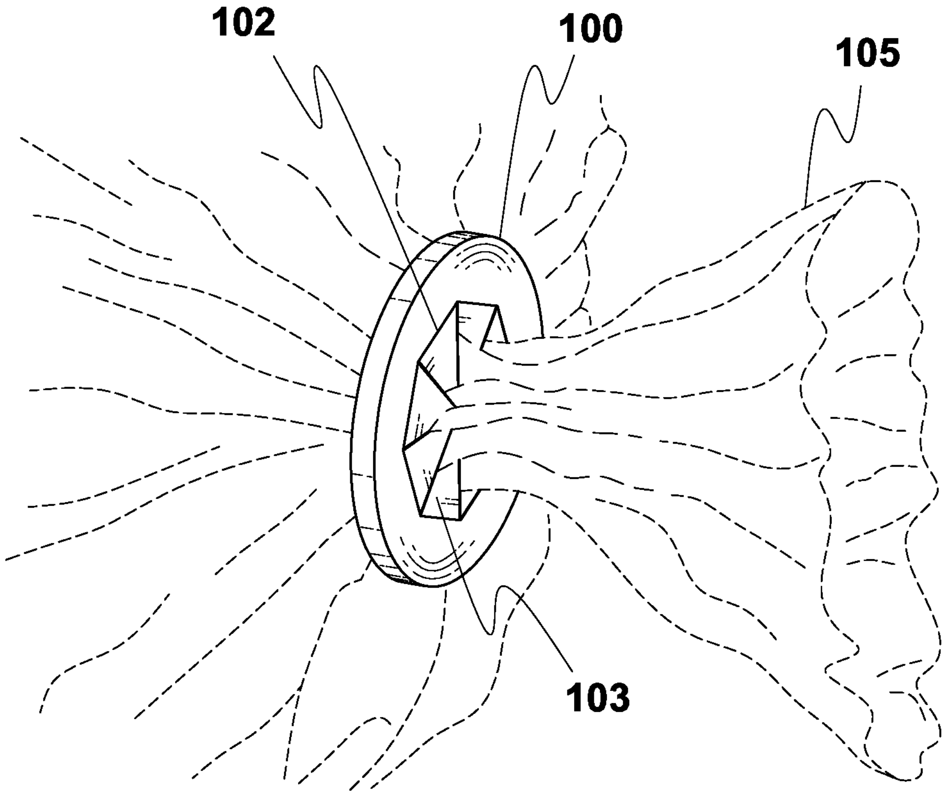

FIG. 4 Depicts the first embodiment of the device in a low angle view after the liner has been threaded and secured in place.

Figure 5:
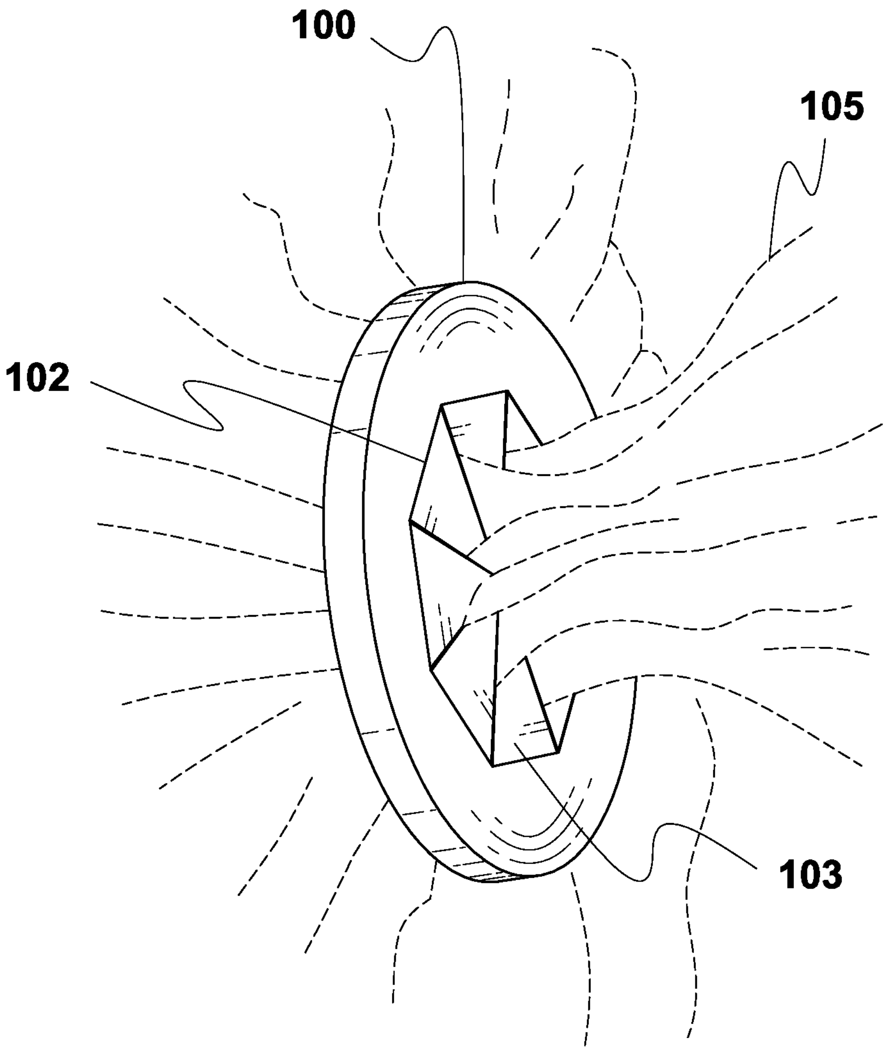

FIG. 5 Depicts the first embodiment of the device in an oblique view after the liner has been threaded and secured in place.

Figure 6:
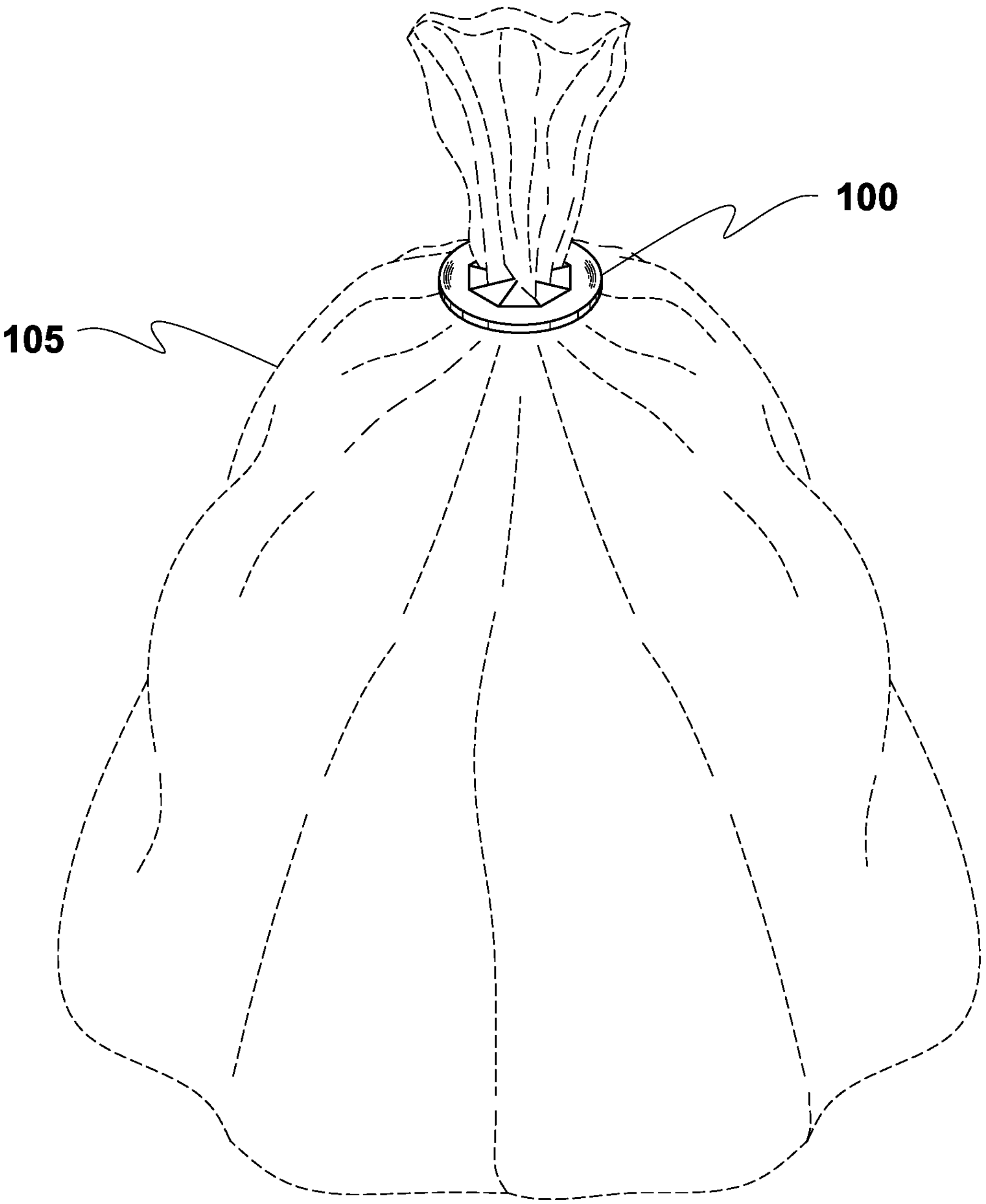

FIG. 6 shows the first embodiment positioned as a closure to a filled trash liner.

Figure 1:
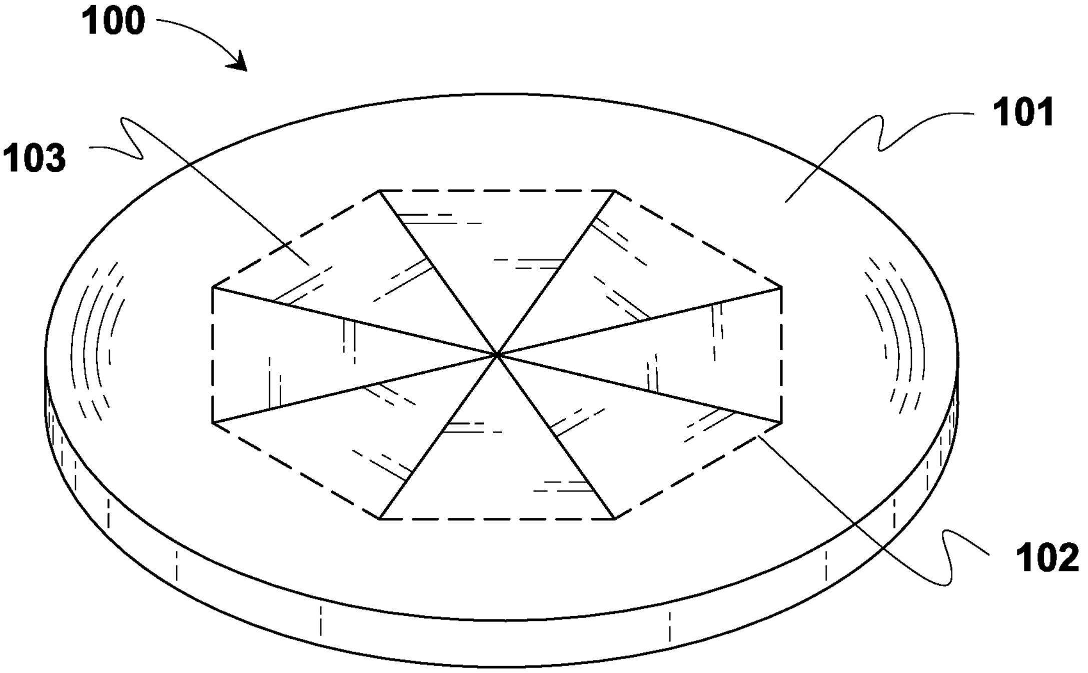
FIGS. 1-6 depict views of the first embodiment, while Figures IA-5A depict views of the second embodiment.
Figure 1A:
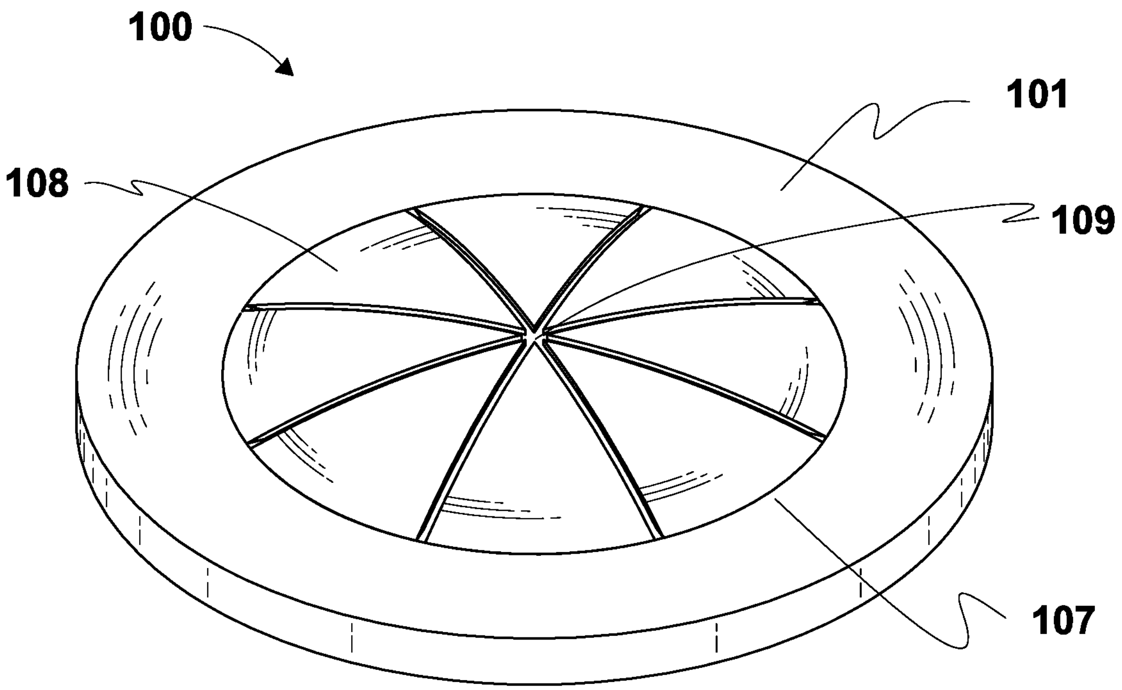
Figure 2:
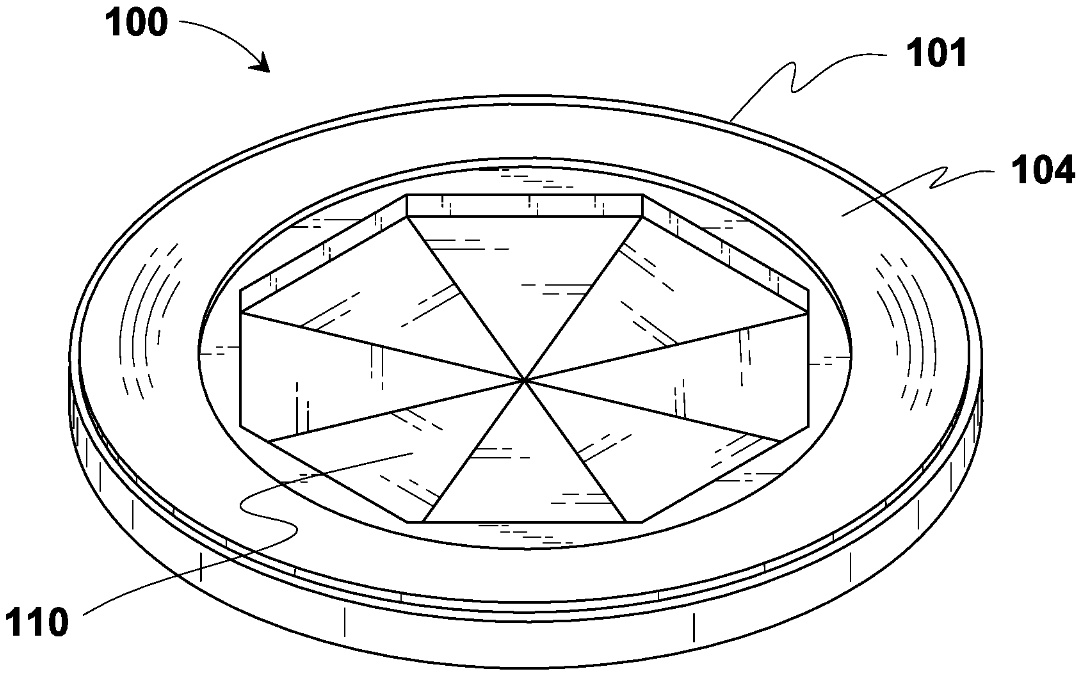
Figure 2A:
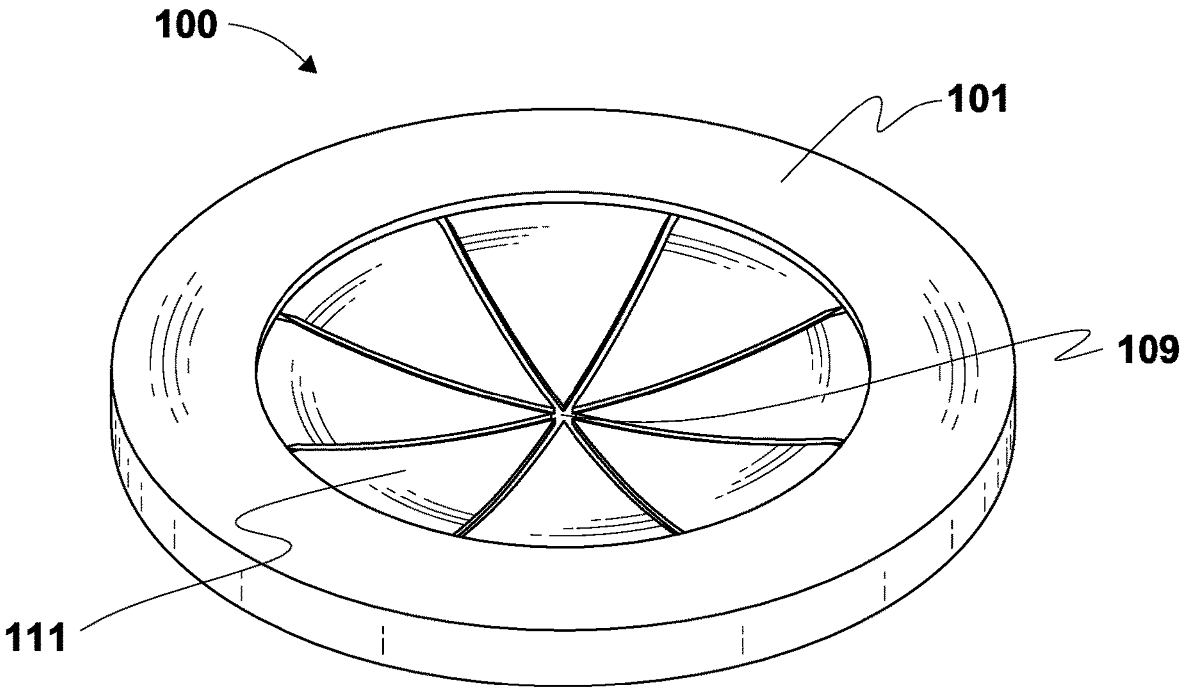

FIG. 1A shows the view of the second embodiment from the user's perspective before it has been threaded. This is the obverse side of the embodiment FIG. 2A shows the reverse side of the second embodiment before it has been threaded and fitted against the liner and the receptacle.

Figure 3A:
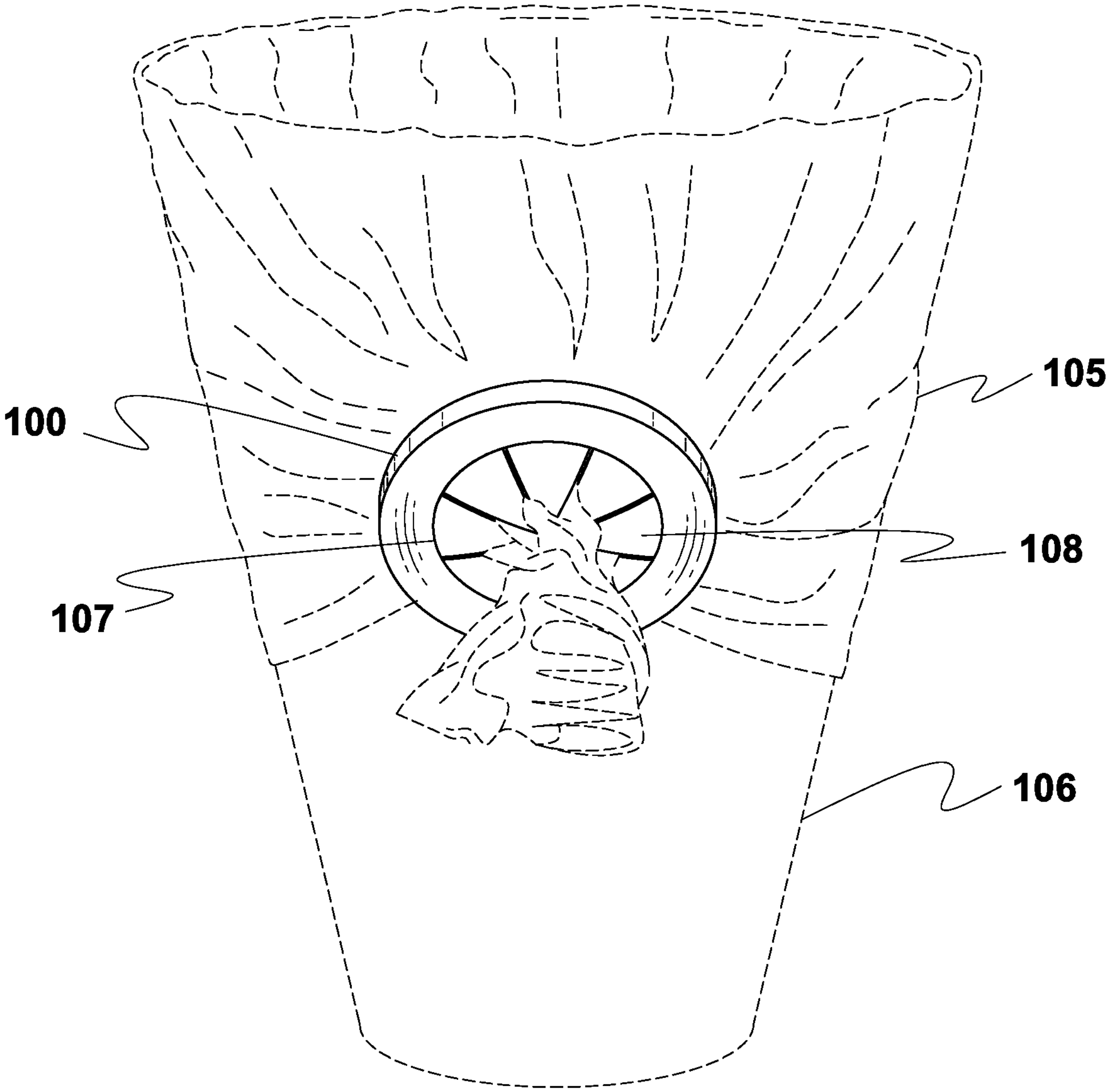
Figure 4A:
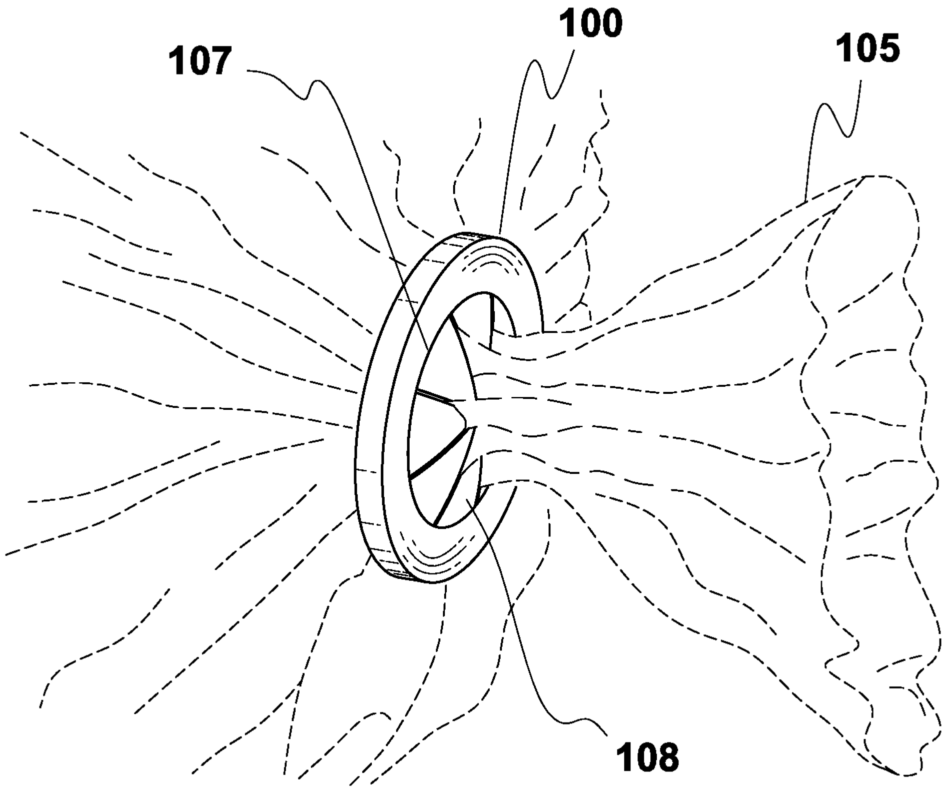

FIG. 3A shows the second embodiment of the device installed, showing what the receptacle, the trash liner, and the embodiment would look like together. This drawing provides a visual representation of how the device functions in practice, demonstrating how the curvilinear arced triangular flaps function as a hinge mechanism to permit the flaps to bend and secure and retain the trash liner in place, preventing it from slipping into the receptacle. This drawing can help to illustrate the intended use of the device and how it fits into the larger context of a trash system FIG. 4A Depicts the second embodiment of the device in a low angle view after the liner has been threaded and secured in place.

Figure 5A:
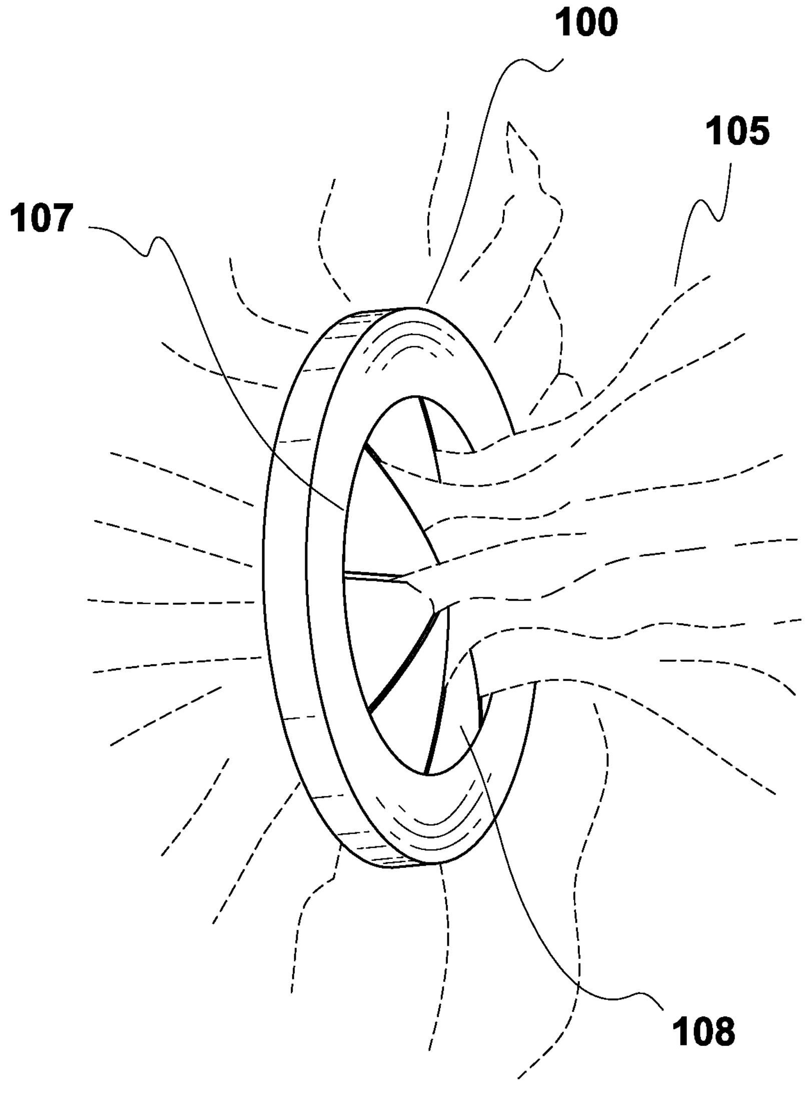

FIG. 5A Depicts the second embodiment of the device in an oblique view after the liner has been threaded and secured in place.

DRAWINGS—REFERENCE NUMERALS

Elements 100, 101, 105 and 106 are common to drawings of both embodiments.

100 embodiment as a whole
101 rim
102 creased base hinge mechanism
103 triangular hinged flap
104 peelable adhesive strip
105 plastic trash liner
106 trash receptacle
107 curvilinear hinge mechanism
108 curvilinear arced triangular flap
109 2 mm aperture
110 reverse side of triangular hinged flap
111 reverse side of curvilinear arced triangular flap Detailed Description FIGS. 1-5 First Embodiment The first embodiment of the invention is a disk-shaped device 100, made of solid non-corrugated cardboard (also known as chipboard), with a thickness of 3 mm and a diameter of 53 mm. The device is designed to secure plastic trash liners 105 from slipping from the rim of a trash receptacle. 106 The device consists of eight identical isosceles triangular hinged flaps 103, positioned around the center of the disk, and each flap has a creased base 102 on the obverse side of the disk, serving as a hinge mechanism. 102 The vertices of each triangular flap converge at the center point of the disk and the base of each flap is positioned in a circular arrangement around the circumferential rim 101, which has a width of 8 mm and extends fully around the circumference of the disk. This design allows the flaps to be flexible and adapt to the shape of the trash liner FIGS. 4-5. To use the device, the plastic trash liner is threaded through the central point of the reverse side of the disk FIG. 2, where the flaps converge, and secured against the receptacle by pulling the loose end of the liner until the device is firmly in place against both the liner FIGS. 4,5 and the receptacle FIG. 3. The reverse side of the device features a circular adhesive strip with a peelable protective covering 104, which can be used to attach the device to a filled trash liner after it has been removed from the receptacle FIG. 6, creating a tight and secure seal by applying pressure to the contact point between the device and the filled liner.

Operation-FIGS. 1-6

The operation of the first embodiment of the invention involves placing the open end of a plastic trash liner inside a trash receptacle, draping the excess portion of the liner over the rim of the receptacle, and then twisting the excess portion of the open end of the liner together. The twisted portion of the liner is then threaded through the central point of the reverse side FIG. 2 of the disk-shaped device, and the device is secured against the receptacle by pulling the loose end of the liner until the device is firmly in place against both the liner and the receptacle. FIG. 3. The circular adhesive strip 104 on the reverse side of the device can be used to attach the device to a filled trash liner FIG. 6 after it has been removed from the receptacle, creating a tight and secure seal by applying pressure to the contact point between the device and the filled liner.

Detailed Description FIGS. 1A-5A Second Embodiment

The second embodiment 100 is a disk-shaped device made of molded rubber with a thickness of 3 mm and a diameter of 53 mm, designed to secure plastic trash liners 105 from slipping from the rim of a trash receptacle 106. The device has eight identical curvilinear arced triangular flaps 108 positioned around the center of the disk 109, serving as a hinge mechanism 107. The flaps only extend to a 2 mm aperture 109 located in the center of the disk. The base of each curvilinear arced triangular flap 107 is positioned in a circular arrangement around the central point and is in contact with the circumferential rim 101, which has a width of 8 mm and extends fully around the circumference of the disk. This allows the flaps to be flexible and adapt to the shape of the trash liner. To use the device, the plastic trash liner is threaded through the aperture 109 from the reverse side of the disk 110, FIG. 2A and then secured against the receptacle by pulling the loose end of the liner until the device is firmly in place against both the liner FIGS. 4A-5A and the receptacle. FIG. 3A The reverse side of the curvilinear arced triangular flaps 111 are in contact with the liner when the liner is in place against the receptacle. The reverse side of the device does not feature an adhesive strip. 110, FIG. 2A.

Operation FIGS. 1A-5A

The second embodiment FIG. 1A-5A of the device operates by using eight identical curvilinear arced triangular flaps (108) positioned around the center of the molded rubber disk. The base of each triangular flap 107 is positioned in a circular arrangement around the circumferential rim of the disk 101, which has a width of 8 mm and extends fully around the circumference of the disk. The tip of each triangular flap is positioned around the central 2 mm aperture. 109 When the plastic trash liner is threaded through the central aperture 109 from the reverse side of the disk 110 and then secured against the trash receptacle by pulling the loose end of the liner, the flaps flex and adapt to the shape of the trash liner, creating a tight and secure fit FIGS. 4A,5A between the device, the liner, and the receptacle. FIG. 3A. The reverse side of the device does not feature an adhesive strip. FIG. 2A.

Conclusions, Ramifications and Scope

The first embodiment is a disk-shaped device made of solid non-corrugated cardboard (also known as chipboard) with a thickness of 3 mm and a diameter of 53 mm.

The second embodiment is a disk-shaped device made of molded rubber with a thickness of 3 mm and a diameter of 53 mm.

Both embodiments are designed to secure plastic trash liners from slipping from the rim of a trash receptacle.

The first embodiment consists of eight identical isosceles triangular hinged flaps, with a creased base on the obverse side serving as a hinge mechanism.

The second embodiment consists of eight identical curvilinear arced triangular flaps, serving as a hinge mechanism.

Both embodiments allow the flaps to be flexible and adapt to the shape of the trash liner.

The first embodiment features a circular adhesive strip on the reverse side with a peelable protective covering.

The second embodiment does not have an adhesive strip.

Ramifications:

The use of the invention results in a more secure trash liner and reduces the likelihood of it slipping from the rim of the trash receptacle.

The disk-shaped design of the invention allows for ease of use, as the plastic trash liner is simply threaded through the central point of the device.

The hinge mechanism of both embodiments allows the flaps to be flexible and adapt to the shape of the trash liner, providing a tight and secure seal.

The use of the adhesive strip on the reverse side of the first embodiment allows for the device to be attached to a filled trash liner after it has been removed from the receptacle, making it easier to handle and dispose of the filled liner.

Scope:

The scope of the invention encompasses the use of the disk-shaped device to secure plastic trash liners from slipping from the rim of a trash receptacle. The invention is designed to be used in various settings, such as households, office buildings, and public spaces. The scope of the invention also includes the use of both the first and second embodiments of the device, as well as any future modifications or variations that would fall within the spirit and scope of the invention.

I claim:

1. A disk-shaped device for use with a plastic trash liner and a trash receptacle comprising:

a chipboard disk with a thickness of 3 mm and a diameter of 53 mm, said chipboard having eight identical triangular flaps positioned in a circular arrangement around a central point, each of said eight triangular flaps having a creased base acting as a hinge mechanism;

a circumferential rim measuring 8 mm in width encircling the entirety of the chipboard disk and wherein the creased base of each of said triangular flaps is in contact with the circumferential rim;

and a circular adhesive strip, with a peelable protective covering, applied to the reverse side of said circumferential rim, said circular adhesive layer substantially covering the reverse side of said circumferential rim, wherein said disk-shaped device is designed to thread a loose end of said plastic trash liner through said central point on the reverse side of said chipboard disk to secure said plastic trash liner against said trash receptacle by pulling the loose end of said plastic trash liner which has been threaded through the central point of said chipboard disk until said disk-shaped device is firmly in place against both said plastic trash liner and said trash receptacle.

* * * * *